June 22, 1926.
N. P. BACH
1,589,454
VACUUM SEALING MACHINE
Filed July 29, 1924
4 Sheets-Sheet 2
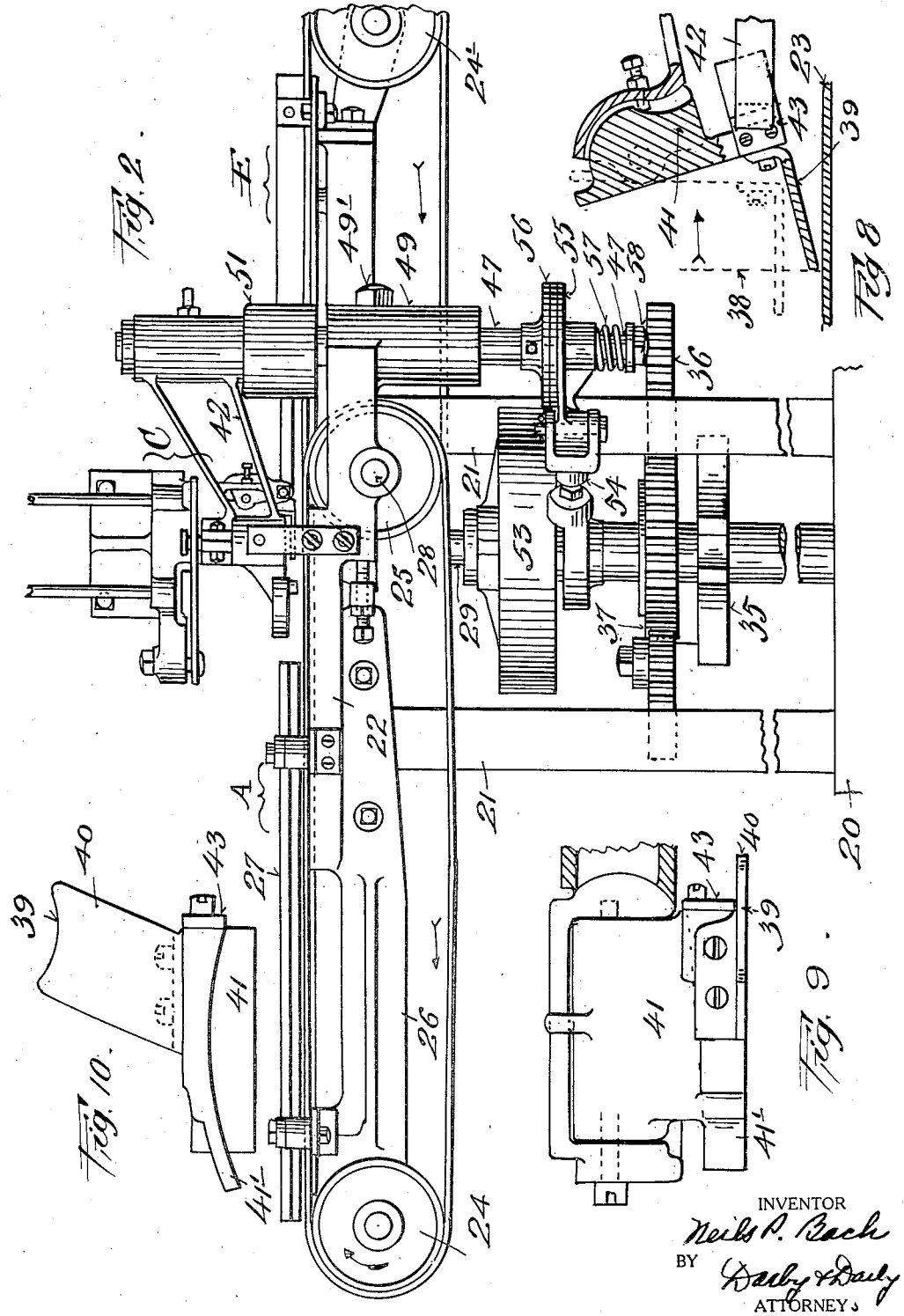
INVENTOR
Neils P. Bach
BY Darby & Darby
ATTORNEYS

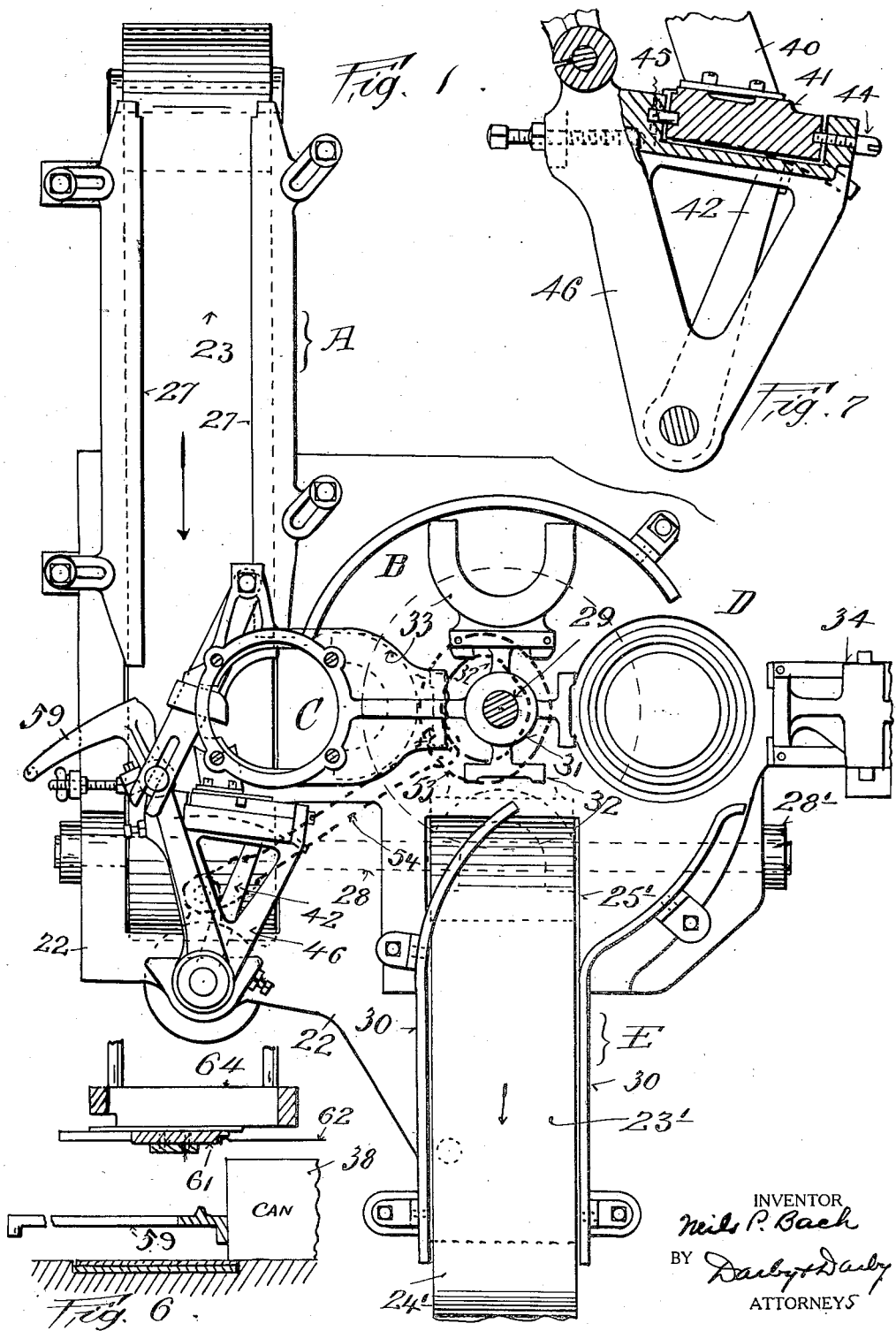

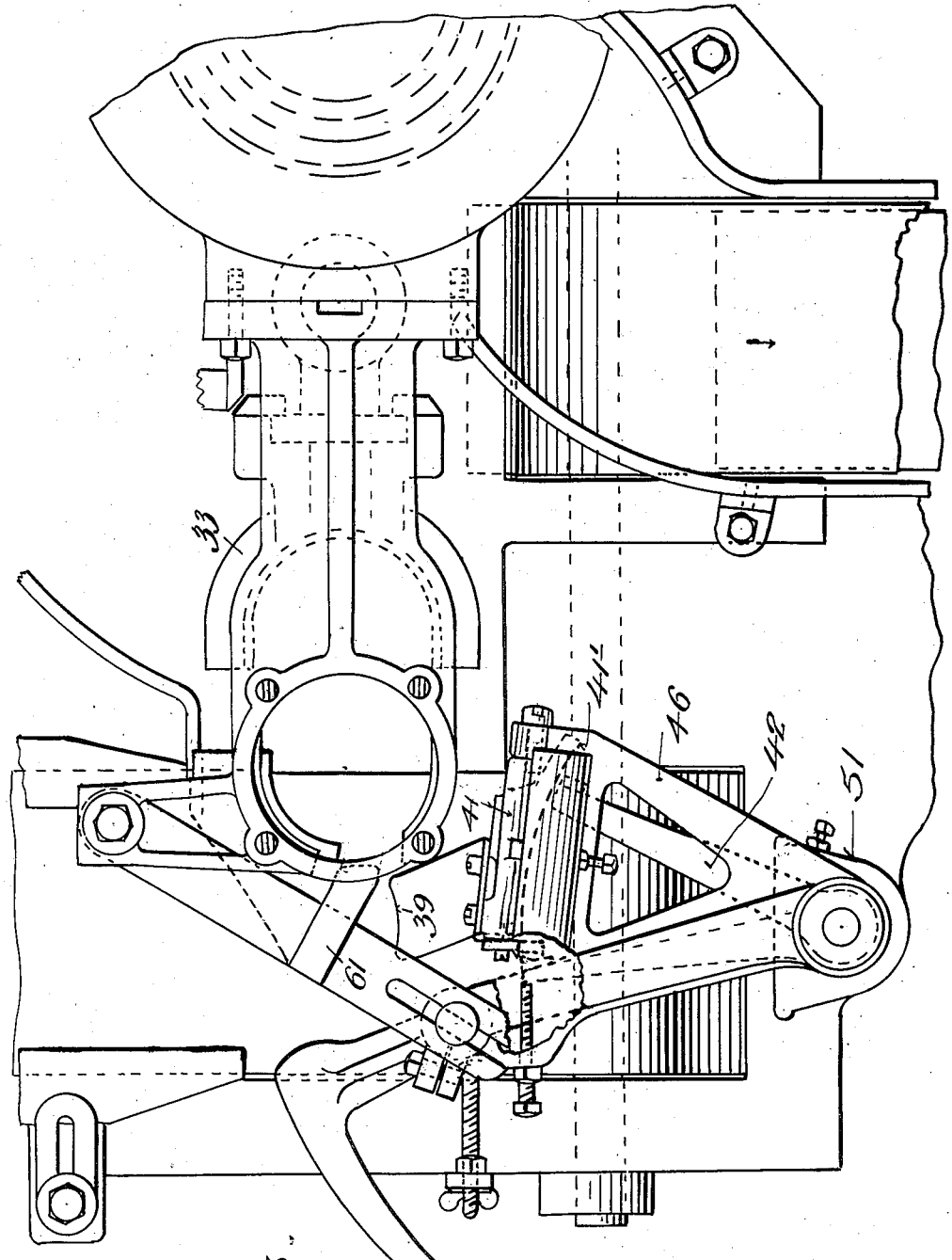

June 22, 1926. 1,589,454
N. P. BACH
VACUUM SEALING MACHINE
Filed July 29, 1924 4 Sheets-Sheet 4

INVENTOR
Neils P. Bach
BY
ATTORNEYS

Patented June 22, 1926.

1,589,454

UNITED STATES PATENT OFFICE.

NEILS P. BACH, OF MILLBURN, NEW JERSEY, ASSIGNOR TO THERMOKEPT CORPORATION, OF NEW YORK, N. Y., A CORPORATION OF DELAWARE.

VACUUM SEALING MACHINE.

Application filed July 29, 1924. Serial No. 728,821.

This invention relates to improvements in canning machines and more particularly to that type of machine wherein the can covers are supplied before vacuum is applied and the sealing is done in vacuo.

A further object of my invention includes the production of a machine of the type specified wherein the cover supplying mechanism is made to function with absolute certainty and wherein the operative parts are reduced to a minimum.

Other objects will appear hereinafter, and I attain these objects by the construction shown in the accompanying drawings, wherein—

Fig. 1 is a plan view of a part of a vacuum sealing machine which embraces the principles of my invention.

Fig. 2 is a view thereof in elevation.

Fig. 3 is an enlarged plan view showing the cover feeding mechanism in detail.

Fig. 6 is a view taken on the line 6—6 of Fig. 4.

Fig. 7 is a view taken on the line 7—7 of Fig. 5.

Fig. 8 is a sectional view of the trip device in depressed position.

Fig. 9 is a face view of the trip device of Fig. 8 viewed in the direction of the arrow; and Fig. 10 is a bottom side view of the tripper plate.

Like numerals refer to similar parts throughout the several views.

Figures 4, 5:
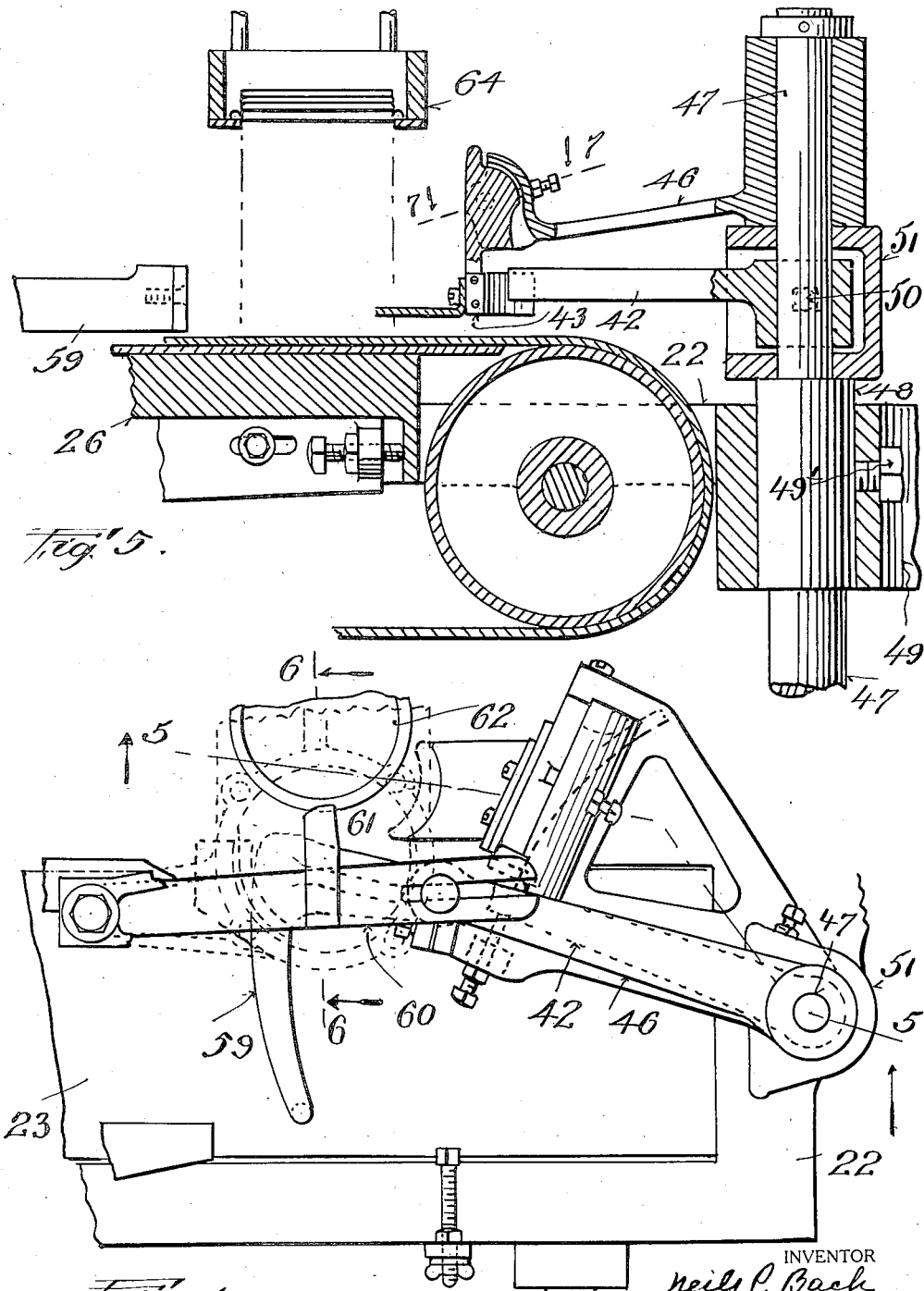
Fig. 4 is a view similar to Fig. 3, with the cover feed mechanism functioning to deliver a cover.
Fig. 5 is a view taken on the line 5—5 of Fig. 4.

It is among the prime purposes of my invention to produce a can cover feed mechanism which is automatic in operation and wherein the operative parts are reduced to a minimum, thereby saving greatly not only in the expense of manufacture of the machines but also in their upkeep.

A preferred construction which embraces the principles of my invention comprises a can supplying mechanism A for conveying filled cans to the sealing turret B through the can cover supplying station C, where each can is in turn supplied with a cover placed thereon while passing through the cover supply station. The can is then moved to station D where it is enclosed in a vacuum chamber and where, after vacuumization, it is sealed under vacuo and then removed by the discharge conveyor mechanism E. The entire assembly is supported on a suitable frame base 20, having standards 21, 21 for supporting a table 22.

The can supplying mechanism A comprises an endless conveyor or belt 23 and supporting and drive pulleys 24 and 25 respectively. The supporting pulley 24 is carried on an adjustable plate 26 which is supported from the table 22 and is provided with guides 27. The drive pulley 25 is mounted on a drive shaft 28 and is driven from a suitable source of power (not shown) by pulley 28'. Mounted on the drive shaft 28 is the can discharge drive pulley 25' carrying the discharge conveyor 23' supported over pulley 24'. Curved can guides 30, 30 direct the cans on to the discharge conveyor at the turret end for discharge in the direction indicated by the arrow. The cans are conveyed to the can cover supply station for receiving a cover and are then automatically admitted and placed in the open can holder 33 at the receiving side of the turret B. The turret (likewise the sealing seamer, not shown), forms no part of my present invention and is indicated in part merely to show its relationship to the cover feed mechanism and associated parts. It is sufficient for the present purpose to state that the turret shaft 29 carries rigidly secured thereto a sleeve 31, on which are extensions 32 for receiving the semi-cylindrical can holders 33, two of which are indicated for the purpose of illustration. It is understood that the turret shaft 29, with its can holders, rotates intermittently, a quarter of a turn at a time, and carries the successive cans from the receiving side C to the sealing side D of the turret to the discharge E. This motion is imparted by any desired means, as a Geneva drive 35 and suitable drive gears 36. These gears receive their motive power from any external source, as a pulley or motor (not shown). This motive power also drives the conveyors and the can cover feed mechanism through pulley 28' and gears 36 and 37, respectively.

I will now describe the cover feed mechanism and its associated parts.

Cans are fed on to the supply conveyor belt 23 by hand or otherwise and are carried into position for entering the turret and for receiving a cover. When a can (38) engages the curved edge 39 of the tripper plate 40 the impact is sufficient to over-balance the tripper plate block 41, causing it to tilt in the manner shown in Fig. 8. The end of the operating lever or sweep 42 now engages the block edge 43 and rocks the cover feed mechanism from its normal position (Fig. 3) to its extreme feed position (Fig. 4). The tripper carrying block 41 is pivotally mounted on pivot pins 44 and 45 in a bracket 46. This bracket is pivotally mounted above the housing 51 on the upright journal 47 which passes through a sleeve 48. This sleeve is locked in a seat 49 of table 22 by bolt 49'. Journal 47 also carries the sweep 42 which is secured on said journal within the housing 51 by a set screw 50, or other means, so as to oscillate with the journal as it rocks back and forth in response to the cam action of cam 53, causing the cam arm 54 to rock the friction plate 55. This plate engages a similar friction plate 56 which is secured on the journal 47 and is held in frictional engagement by spring 57 and the adjustment nut 58. By reason of the constant motion of the cam and cam arm, the sweep 42 rocks back and forth freely along the block finger 41' until a can trips and over-balances the trip plate. Sweep 42 now causes the bracket 46 to rock and as it does so it carries with it the can placing finger or pusher 59 and the cover take-off bracket 60 on which is fastened the cover take-off knife 61 for removing a cover 62 from the bottom of the cover stack (not shown) which is understood is held in the cover rack 64. The can and cover loosely placed thereon are positioned in the semi-cylindrical can holder and while it is moved the first quadrant, the cover feed mechanism and associated parts resume their original position. The mechanism is now ready to receive the next can which is permitted to move into tripping position as soon as the can guide finger 59 is withdrawn. The operation above described is now repeated and the second can is supplied with a cover and placed in position within the can holder to be moved forward. This operation is repeated as fast as cans are positioned to operate the trip device. In the meantime, the cans with a cover loosely placed thereon are successively moved into the sealing position at D. As soon as station D is reached, the complementary semi-cylindrical can holder closes on to the turret can holder to encase the can, which is then vacuumized, sealed and discharged in the known manner.

Having now described my invention, what I claim as new and useful, of my own invention, and desire to secure by Letters Patent, is:

1. In a vacuum sealing machine, the combination of a can conveyor, and means for supplying covers for cans for vacuum sealing, an oscillating arm, and means for oscillating said arm freely across said conveyor, means situated in path of the cans, and above said oscillating arm to be engaged by said arm upon being tripped by a can, and means for causing said cans to be moved into sealing position for sealing under vacuum.

2. In a vacuum sealing machine, the combination of a can conveyor for moving cans to be sealed, a trip device situated in the path of said cans for tripping as a can hits the same, an arm co-acting with said trip device to cause the can and trip device to be deflected from the path of travel of the cans on the conveyor.

3. In a vacuum sealing machine, the combination of a can conveyor for moving cans to be sealed, a trip device situated in the path of said cans for tripping as a can hits the same, an arm co-acting with said trip device to cause the can and trip device to be deflected from the path of travel of the cans on the conveyor, and means for supplying a cover to said can while traveling with said trip stop.

4. In a vacuum sealing machine, the combination of a can conveyor for moving cans to be sealed, a counter-balanced member suspended above said conveyor to be overbalanced by a can striking said member, a sweep oscillating freely across the path of the plate of said counter-balanced member but engaging the same when overbalanced, means associated with said counterbalanced member for removing said can from the conveyor, and means for supplying a cover to said can.

5. In a vacuum sealing machine, the combination of a can conveyor for moving cans to be sealed, a counter-balanced member suspended above said conveyor to be overbalanced by a can striking said member, a sweep oscillating freely across the path of the plate of said counter-balanced member but engaging the same when overbalanced, means associated with said counterbalanced member for removing said can from the conveyor, a supply of covers beneath which said cans are moved, a cover removing knife passing beneath the cover stack and removing a single cover at a time, and means for placing said cover on the can.

6. In a vacuum sealing machine, the combination of a can conveyor for moving cans to be sealed, a counter-balanced member suspended above said conveyor to be overbalanced by a can striking said member, a sweep oscillating freely across the path of the plate of said counter-balanced member but engaging the same when overbalanced, means associated with said counterbalanced member for removing said can from the conveyor, a supply of covers beneath which said cans are moved, a cover removing knife passing beneath the cover stack and removing a single cover at a time, means for placing said cover on the can, and means for moving said can and cover into sealing position.

In testimony whereof I have hereunto set my hand.

NEILS P. BACH.